Jan. 5, 1937.  J. F. HELLWEG ET AL  2,066,349
APPARATUS FOR BROADCASTING TIME SIGNALS
Filed April 5, 1935  4 Sheets-Sheet 1

INVENTORS
JULIUS F. HELLWEG
BY PAUL SOLLENBERGER
ATTORNEY

Jan. 5, 1937. J. F. HELLWEG ET AL 2,066,349
APPARATUS FOR BROADCASTING TIME SIGNALS
Filed April 5, 1935 4 Sheets-Sheet 3
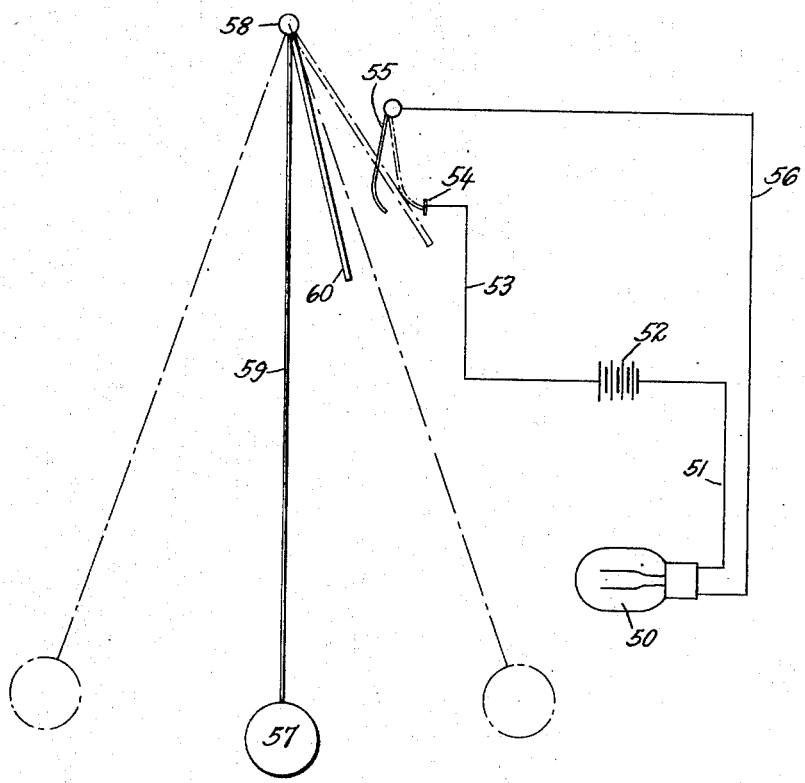
FIG. 3.
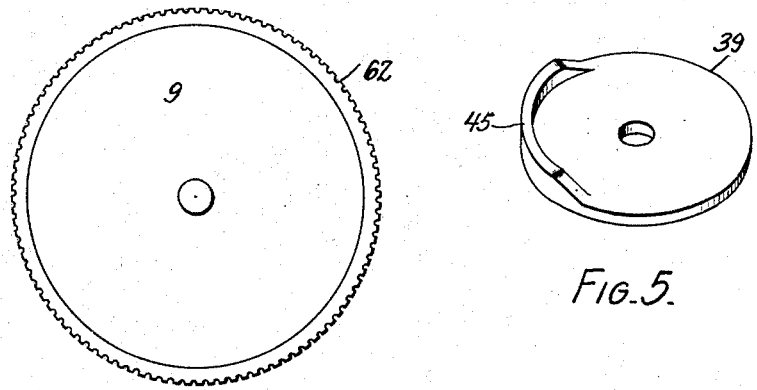
FIG. 4.
FIG. 5.
INVENTORS
JULIUS F. HELLWEG
BY PAUL SOLLENBERGER
ATTORNEY Jan. 5, 1937.  J. F. HELLWEG ET AL  2,066,349
APPARATUS FOR BROADCASTING TIME SIGNALS
Filed April 5, 1935  4 Sheets-Sheet 4

INVENTORS
JULIUS F. HELLWEG
BY PAUL SOLLENBERGER
ATTORNEY

Patented Jan. 5, 1937

2,066,349

UNITED STATES PATENT OFFICE 2,066,349

APPARATUS FOR BROADCASTING TIME SIGNALS

Julius F. Hellweg, United States Navy, and Paul Sollenberger, Washington, D. C.

Application April 5, 1935, Serial No. 14,896

2 Claims. (Cl. 58—23)

(Granted under the act of March 3, 1883, as amended April 30, 1928; 370 O. G. 757)

This invention relates to horology and more particularly to that phase of horology wherein a time signal broadcasting control mechanism or secondary clock may be quickly and accurately brought into synchronism and into phase or step with a primary or standard clock mechanism.

As a rule clocks used as primary time standards are located in underground vaults where temperature changes and other factors that tend to influence the accuracy thereof may be eliminated as far as possible. Standard clocks are, therefore, more or less inaccessible. For automatically opening and closing an electric circuit for controlling the broadcast of time signals a secondary time standard is required principally because it is not desired to load the standard clock especially with a variable load.

Heretofore in the broadcasting of accurate time signals by radio and in the transmission of accurate time signals by wire, it has been necessary to make a time comparison between the standard clock and the secondary or transmitting clock by means of a chronograph. After the difference between the recorded time indicated by the standard clock and that of the transmitting clock was measured, it was then necessary to apply to the transmitting clock an acceleration or retardation for a sufficient time to correct for the measured difference between the clocks. Inasmuch as the application of this correction to the transmitting clock depended upon the judgment and calculations of the operator together with other vital factors, it was necessary to make a second chronograph run to see if the proper correction had been made. This double chronograph run together with the necessary calculations and corrections usually required about fifteen minutes of time depending upon the skill of the operator.

In contrast with the laborious method of bringing the transmitting clock into step with the standard clock and checking the time indicated by both clocks by means of a chronograph, the present invention enables the transmitting clock to be brought into step with the standard clock by merely turning a key and advancing or retarding the transmitting clock until the two clocks are in step.

The principal object of this invention is to provide a time broadcasting or transmitting clock system in which the difference between the time indicated by the transmitting clock and that indicated by a standard clock may be visually determined to a very small fraction of a second and wherein the transmitting clock may be quickly set to indicate the same time as the standard clock and this setting may be checked visually without the necessity of chronograph records.

Other and further objects of this invention will be apparent from the following specification and claims.

Briefly speaking, the transmitting clock of this invention comprises a synchronous motor driven clock mechanism operated by electrical impulses generated in a piezo-electric crystal controlled oscillation generator in which the stator of the synchronous motor may be rotated by means of a key to bring the rotor of the synchronous motor and the associated clockwork into proper phase with a standard clock used to control the flashing of a glow lamp at predetermined instants of time at which predetermined instants a rotatable element of the clockwork driven by the rotor should be in a predetermined position to insure that the transmitting clock is in proper step with the standard clock.

This invention may be more readily understood if this description is read in connection with the accompanying drawings wherein Figure 1 is an elevational view of the transmitting clock mechanism shown partially in section and partially diagrammatically.

Figure 3 is a diagrammatic view disclosing one way in which the glow lamp 50 of the transmitting clock may be flashed under control of a standard clock.

Figure 4 is a detail view of the rotor 9 of the synchronous motor of the transmitting clock.

Figure 5 is a perspective view of the circuit closing cam 39 of the transmitting clock.

Figure 1:
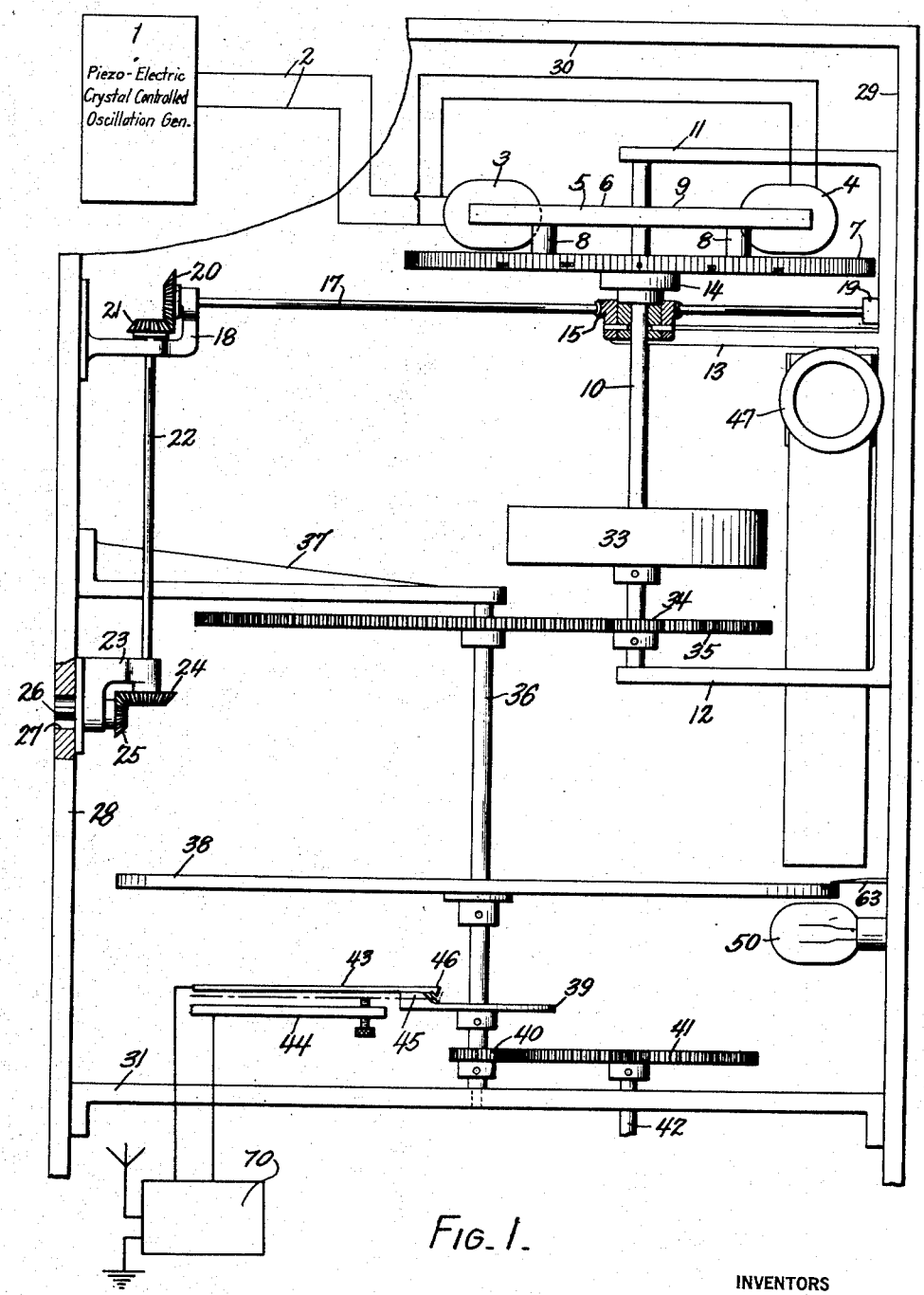
Figure 2:
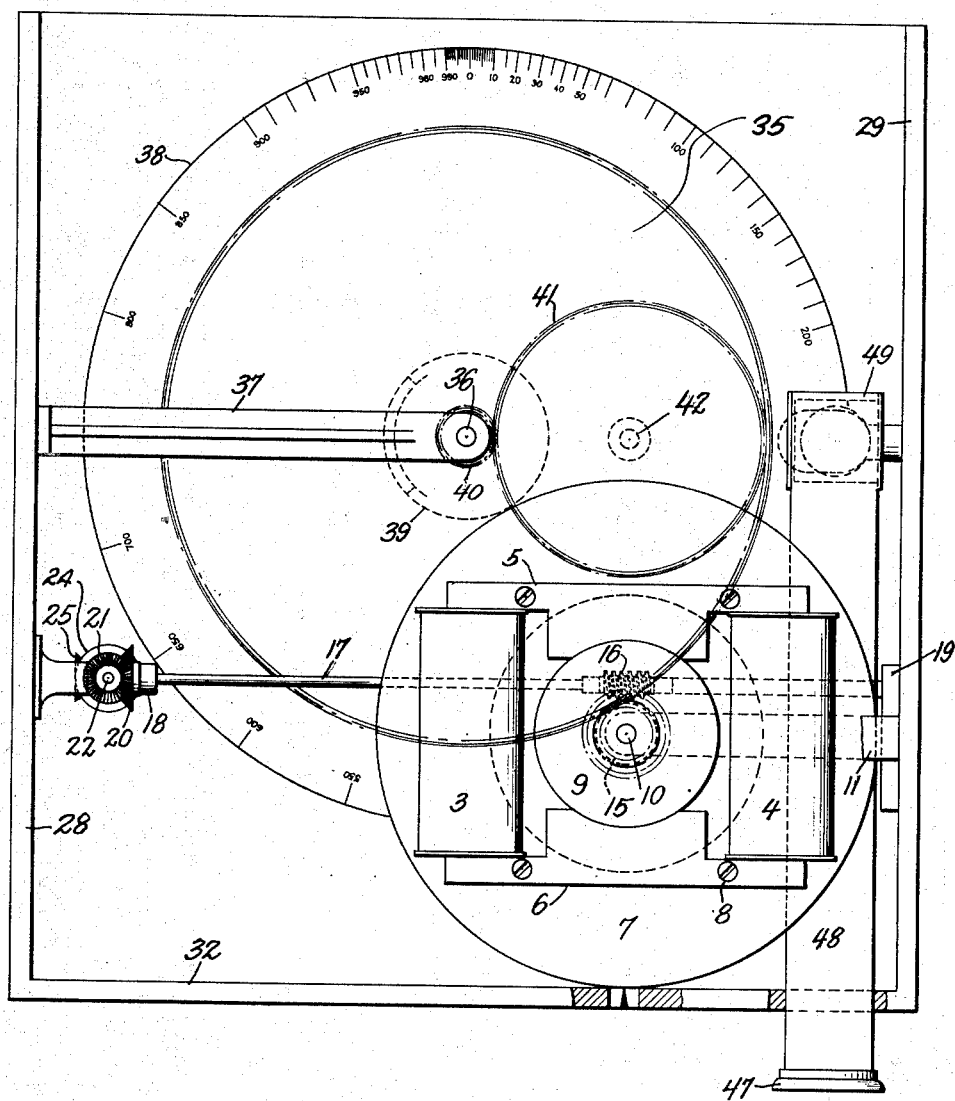
Figure 2 is a plan view of the transmitting clock mechanism partially in section with the cover 30 removed.
Figure 6:
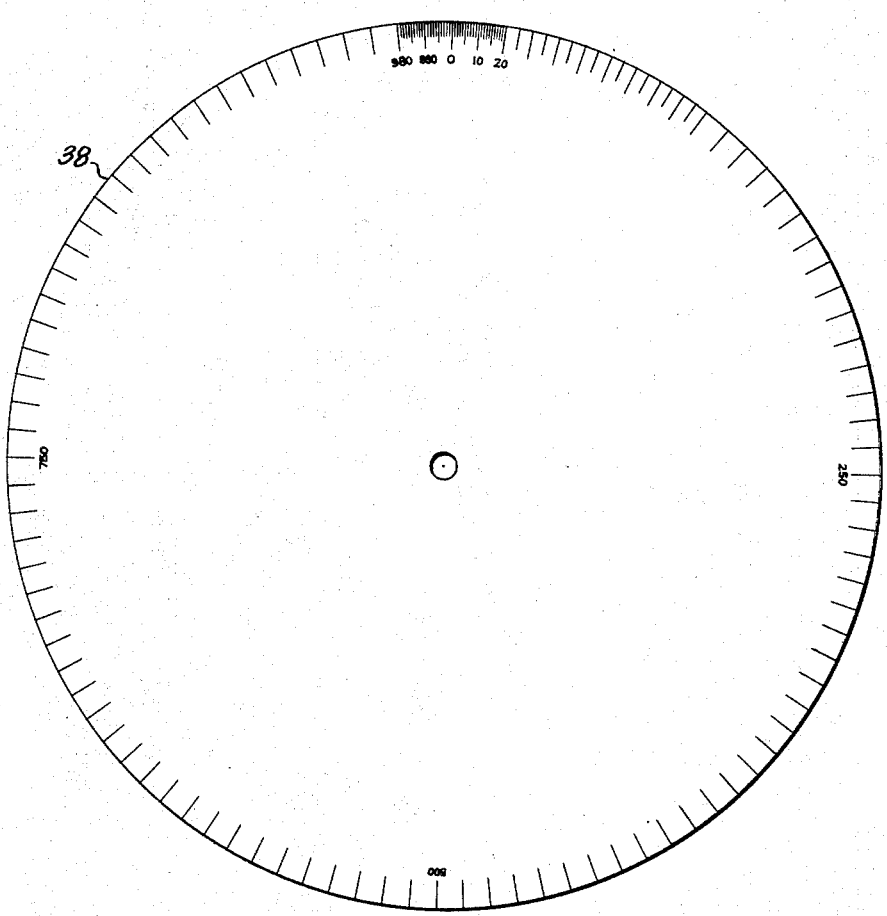
Figure 6 is a plan view of the engraved glass dial 38 of the transmitting clock showing a part of the engraved radial lines thereon, each of which represents, in this case, 1/1000th of a second of time.
Figure 7:
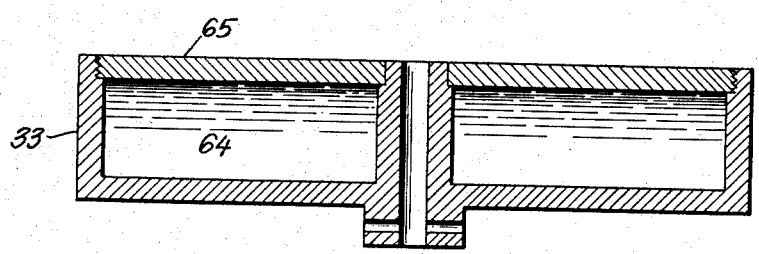
Figure 7 is a sectional detail view of the mercury loaded flywheel of the synchronous motor of the transmitting clock.

In the drawings, 1 is a crystal controlled oscillator connected by leads 2 to the field coils 3 and 4 of a synchronous motor of the Lacour wheel type. Field coils 3 and 4 are used to cyclically energize the magnetic pole pieces 5 and 6 of the motor. The field coils 3 and 4 and the pole pieces 5 and 6 are mounted upon supports 8 fixed to a brass plate 7 which is adapted to be revolved independently of the rotor 9 of the synchronous motor.

The brass plate or synchronous motor frame 7 is apertured at its center in order to permit the rotor shaft 10 to extend therethrough. The rotor 9 of the synchronous motor is fastened to the shaft 10 to turn therewith as an integral unit. Shaft 10 is mounted in appropriate bearings in bearing brackets 11, 12, and 13. The plate 7 carrying the field coils and pole pieces of the synchronous motor is fastened to a collar 14 surrounding the rotor shaft 10. Rigidly attached to the collar 14 is a gear 15 which cooperates with a worm gear 16. The worm gear 16 is mounted upon a shaft 17 supported in bearings 18 and 19. A beveled gear 20 is mounted on the shaft 17 to cooperate with and be turned by the beveled gear 21 mounted on shaft 22. The shaft 22 is supported in bearings carried by brackets 18 and 23. A second beveled gear 24 is carried by the shaft 22 and this beveled gear meshes with beveled gear 25 on the key shaft 26 passing through aperture 27 in the wall 28 of the housing of the transmitting clock mechanism.

By applying a key to the square portion of the key shaft 26 in aperture 27, it is seen that the plate 7 carrying the field coils and pole pieces of the synchronous motor may be rotated by rotating the shaft 26, which in turn rotates shaft 22, and shaft 17 to rotate the gear 15 and the collar 14 and plate 7.

A hollow mercury loaded fly wheel 33 loaded with mercury 64 and having a removable side 65 is mounted on the shaft 10 and a pinion 34 is carried by said shaft. The pinion 34 engages gear 35 mounted on a shaft 36 which is supported by bearings in the bracket 37 and the bottom frame member 31. An engraved glass dial 38 is mounted on the shaft 36 to turn therewith. A cam 39 is also mounted on the shaft 36 and, when rotated, the portion 45 of said cam is adapted to engage with the portion 46 of a spring contact 43 cooperating with a contact 44. Pinion 40 is also mounted on the shaft 36 to engage with the gear 41 mounted upon shaft 42. An eyepiece 47, associated with a tube 48 and a prism 49, permits the index pointer 63 and a portion of the engraved glass disc 38, immediately above the glow lamp 50, to be viewed from outside the transmitting clock case. The glow lamp 50 is cyclically energized from the battery 52 and conductors 51, 53, 56 and the circuit closing device 54 and 55 under control of the standard clock pendulum 57, which is carried by rod 59 mounted on pivot 58, by means of the projecting member 60 disposed to be movable with the pendulum.

The operation of the time broadcasting clock is as follows:

The crystal controlled oscillator 1 energizes the field coils 3 and 4 of the synchronous motor and causes the rotor 9 to be turned thereby turning shaft 10. In one embodiment of the invention, the crystal oscillator delivers a frequency of 1,000 cycles while the rotor 9 has 100 notches cut in its periphery so that 1,000 notches pass any given point per second, that is the rotor rotates 10 revolutions per second. By making the gear 35 with 10 times as many gear teeth as pinion gear 34, it is seen that the shaft 36 is caused to turn at exactly 1 revolution per second. By graduating the glass disc 38 with 1,000 equally spaced radial lines, it is seen that the angular distance traveled by the disc between one line and the next line represents 1/1000th of a second. In order to set the glass disc 38 to be in step or phase with the standard clock pendulum, the field coils 3 and 4 of the synchronous motor together with the pole pieces 5 and 6 may be turned to advance or retard the disc 38 from the position that it would normally occupy. To determine whether any correction is to be applied to the transmitting clock, the operator looks by way of the eyepiece 47 and prism 49 at that portion of the disc 38 immediately above the glow lamp 50. The glow lamp 50 is illuminated only a short fraction of a second under control of the standard clock and, when the broadcasting clock is in exact step with the standard clock, the glow lamp 50 will glow and illuminate that one of the etched marks on the periphery of the revolving glass disc corresponding to the zero graduation. If this flash is plus or minus of the zero mark, it is brought to coincide with the zero mark by rotating the field coils of the synchronous motor by means of an adjusting key admitted through the hole 27 in the casing of the mechanism. This results in advancing or retarding the disc 38 and the time contact actuating cam 39. A correction of 1/1000th of a second or greater may be applied in this manner and the correction applied can be checked visually by the flashing of the glow light 50 on the revolving scale. After the adjustment so that the flash occurs on the zero line, the transmitter is in exact step with the standard clock.

The contacts 43 and 44 controlled by the cam 39 produce a closing of the circuit to time broadcasting apparatus 70 for a predetermined fraction of a second and then open said circuit. When it is desired to send the time signals hourly, or any other predetermined intervals the gear 41 is used to drive an appropriate program device which performs the required switching operations to put the signals on the radio control line at the appointed hours and to eliminate the omitted seconds from the signals. These features are not shown on the drawings inasmuch as they are not necessary to an understanding of the present invention.

In the description of the above invention, a 1,000 cycle piezo-electric crystal controlled oscillator and a 100 pole synchronous motor rotor with a 10–1 reduction gearing were used to drive the seconds shaft. However, it is to be understood that an oscillator of any desired standard frequency and a synchronous motor with the requisite number of poles and a reduction gear of the proper ratio may be devised to turn the shaft carrying the etched glass plate at one revolution per second or a desired multiple thereof. It is to be understood further that the neon glow light 50 may be flashed under control of the standard clock pendulum in other ways than that shown, as for instance by means of a light sensitive cell with or without amplifiers in lieu of the contacts 54, 55. In this case the pendulum would shield the light sensitive cell from a source of illumination at a predetermined position of the pendulum. A photo-electric cell and lamp system similar to that employed by Hoxie in Patent No. 1,475,583 may be utilized in which case the standard clock pendulum would be substituted to take the place of the disc 11 of Hoxie. The glow lamp 50 could be connected to be energized by an amplifier connected to leads 25 and 26.

The invention described herein may be manufactured and used by or for the Government of the United States of America for governmental purposes, without the payment of any royalty thereon.

We claim:

1. In combination a standard clock, a secondary clock, having a continuously revolving element, inertia means including a body of fluid associated with said revolving element to secure uniformity of revolution of said element, means for periodically opening and closing an electric circuit under control of said secondary clock for transmitting time signals, a glow lamp adjacent said continuously revolving element, means controlled by said standard clock for periodically flashing said glow lamp and illuminating said continuously revolving element once each revolution to make said element appear to stand still, and means for advancing or retarding the opening and closing of the electric circuit controlled by the secondary clock and for shifting the phase of said revolving element whereby the secondary clock may be brought into phase with the standard clock so that the revolving element of the secondary clock is illuminated when it is at a predetermined position.

2. In combination, a standard source of time, a circuit controlling secondary clock having a continuously revolving transparent element provided with graduations thereon, a glow lamp located on one side of said transparent element, a viewing device located on the side of said transparent element opposite said glow lamp, means controlled by said standard source of time for periodically flashing said glow lamp and illuminating said transparent element for a short period of time once each revolution whereby the phase of said disc with respect to the flashing of said glow lamp may be determined at said viewing device, means for periodically opening and closing an electric circuit under control of said secondary clock for transmitting time signals each time said transparent element is in a predetermined desired position, and means for advancing or retarding the opening and closing of said circuit and shifting the phase of said transparent element so that the transparent element of the secondary clock can be shifted to be illuminated when it occupies a predetermined desired position.

JULIUS F. HELLWEG.
PAUL SOLLENBERGER.